США005352733A

United States Patent [19]
Hart

[11] Patent Number: 5,352,733
[45] Date of Patent: Oct. 4, 1994

[54] WATER BASED, SOLVENT FREE, TWO COMPONENT ALIPHATIC POLYURETHANE COATING

[75] Inventor: Richard E. Hart, Irvine, Calif.

[73] Assignee: R. E. Hart Labs, Inc., Irvine, Calif.

[21] Appl. No.: 28,966

[22] Filed: Mar. 10, 1993

[51] Int. Cl.$^5$ .............................................. C08G 18/34
[52] U.S. Cl. ................................ 524/840; 428/423.1; 528/71
[58] Field of Search ............. 524/840; 428/423.1; 528/71

[56] References Cited

U.S. PATENT DOCUMENTS 4,945,128 7/1990 Hille et al. ......................... 524/839
5,227,198 7/1993 Laura et al. ........................ 524/388

Primary Examiner—John Kight, III
Assistant Examiner—R. F. Johnson
Attorney, Agent, or Firm—Thorpe, North & Western

[57] ABSTRACT

A water based, solvent free, two component polyurethane-polyurea dispersion containing up to 65% solids. The first component is a polyester-polyol phase and an aqueous amine phase mixture. The polyester-polyol is a combination of modified polyester-polyols, low viscosity polyether or polyester-polyols, chain extending low molecular weight polyols, neutralizing amines and a detergent. It has a solids content of 90–100% and is totally hydroxyl functional with a carboxylic acid number of 10 and 50, an hydroxyl number of 180 and 300, an equivalent weight range of 165 and 365 and a viscosity of 600–1500 cps at 25° C. The amine phase is an combination of neutralizing and chain extending amines having ratios preformulated to provide a balanced chain extending cross-linking reaction in aqueous phase with—NCO reactive groups. The aqueous amine blend has an equivalent weight of 40 to 50 and a solids content of 40–60%. The polyester-polyol and amine phases are combined in water at room temperature to form a aqueous component having a solids content of 33 to 48% and has an equivalent ratio between polyester-polyol phase and amine phase of 1.75:1 to 2.25:2. The second component is a 100% solids aliphatic isocyanate having a viscosity of between 1000–3500 cps at 25° C. and provides an NCO to functional groups in the polyester-polyol/amine component ratio of between about 1:1.3 to 1:1.7. This solvent free dispersion dries to a film coating having properties equal to conventional solvent based polyurethane coatings.

24 Claims, No Drawings

WATER BASED, SOLVENT FREE, TWO COMPONENT ALIPHATIC POLYURETHANE COATING

This invention relates to water based, solvent free two component polyurethane protective coatings. More particularly, this invention relates to a water based, solvent free two component crosslinked aliphatic polyurethane-polyurea protective coating system which possess performance properties which are equal to, or even better than the conventional solvent based two-component polyurethane or polyurethane-polyurea systems.

BACKGROUND OF THE INVENTION AND CURRENT STATE OF THE ART

For over 40 years water-borne, or water-based polyurethane's have been in existence. The performance properties of these systems have been improved continuously with literally hundreds of patents being issued during this period in the field of water-borne polyurethane's.

There are at least three important reasons why aqueous polyurethanes have become commercial important in the last few years. The first reason is environmental concerns regarding (solvents) volatile organic compounds ("VOC") being emitted into the atmosphere and causing ozone depletion, acid rain, and possibly a chemical imbalance of the earth's ecosphere. The second reason is economical. Organic solvent systems are expensive and aqueous polyurethane systems do not bear the extra solvent cost. The third, and perhaps most important, reason relates to the fact that aqueous polyurethanes have been improved to the point that, performance wise, they are comparable to or better than the conventional solvent-based polyurethanes for many specific applications.

Typical waterborne polyurethanes are actually polyurethane-polyurea polymers containing both urethane (—NH—CO—O—) and urea (—NH—CO—NH—) groups in a macromolecular chain. These groups are formed by well known polyaddition reactions. The addition reaction between polyisocyanates and polyols to form a urethane grouping may be depicted as:

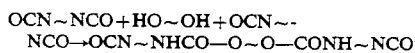

A similar polyaddition reaction between polyisocyanates and amines to form a urea grouping may be represented as:

All current waterborne polyurethanes have one manufacturing process in common. In the first phase of production, a medium molecular weight "prepolymer" is synthesized in a reactor at an elevated temperature (60°–100° C.) leaving approximately 2% to 8% free/terminal unreacted isocyanate (—NCO) groups which are reacted "out" in the water ($H_2O$) phase addition by the formation of a carbamic acid which decarboxylates immediately resulting in the conversion of the isocyanate (—NCO) to an amine (—$NH_2$) accompanied by the release of $CO_2$ and thereby leaving virtually no free or unreacted isocyanate in the polyurethane dispersion. In order for this type of polyurethane to have high-performance properties, e.g., flexibility, hardness, acid, solvent and other chemical resistance, it must be chain-extended in the water phase. The chain-extension phase is a build-up of the prepolymer to a polyurethane having a high molecular weight.

This high molecular weight build-up is usually performed by reacting the prepolymer with amines. Two important problems must be dealt with during the course of this reaction: (1) the control or stabilization of the extremely fast urea formation reaction, (e.g. ~-NCO+$NH_2$~→~NHCONH~) and (2) the control or minimizing of the ensuing viscosity build-up resulting from the increasing of the molecular weight. Because of this, the current state-of-the-art water-borne aliphatic polyurethane dispersions are limited to solids contents of 40% or lower. Moreover, their solvent resistance (as measured by methyl ethyl ketone "MEK" double-rubs) is generally limited to a maximum of 200 to 250 rubs and their resistance to chemicals such as Skydrol (jet aircraft hydraulic fluid), or jet fuels is very poor.

One attempt to solve the problems regarding viscosity (low solids of the dispersion) and high-performance, solvent and chemical resistance, has been to try and improve water-borne polyurethane dispersions by processing the reaction in a solvent as an intermediate aid to control the viscosity build-up during the critical chain extension phase. Typical of these processes are the so-called "acetone" or "NMP" (N-methylpyrrolidone) processes.

According to these types of processes, a polyol is reacted with a diisocyanate to form a prepolymer. Then, in the presence of a solvent, such as acetone or NMP, the prepolymer is reacted with a chain extender such as a polyamine, e.g. ethylenediamine or diethylenetriamine. The solvent based extended urethane polymer is then diluted with water forming an aqueous dispersion of the urethane prepolymer, aliphatic amine chain extended urethane polymer and solvent. The solvent must then be removed by distillation yielding an aqueous dispersion of urethane containing components ranging from the prepolymer to the highest molecular weight aliphatic amine chain extended polyurethane.

In this process the solvent must be distilled out of the system which still results in disposal problems with the resulting solvent. This is not a practical solution and there are relatively few commercial applications of this process.

The most popular process for manufacturing waterborne polyurethane's is the so called "prepolymer blending process." This process utilizes hydrophilically modified prepolymers having free terminal NCO-groups which are more compatible with aqueous systems. These prepolymers, possessing hydrophilicity, are therefore more susceptible to being chain extended with diamines in a water, as contrasted to a solvent, phase which helps build-up the molecular weight of the extended polyurethane polymers and further enhances the performance properties.

In order for this hydrophilic prepolymer blending-/mixing process to function optimally, the dispersion phase must be performed in as short a period of time as possible and at temperatures below the critical point where NCO groups rapidly start to react with the water with the formation of carbamic acid groups and the following release of carbon dioxide. To optimize this process it is often necessary to use 5% to 15% w. levels of a co-solvent such as NMP to adjust for the viscosity build-up during the chain-extension and/or cross-linking phases. This process utilizes chain extension in the water-phase resulting in the prepolymers being either reacted with the difunctional amines to yield linear, flexible polyurethane-ureas, or cross-linked with polyfunctional amines which produces crosslinked systems. Water-borne polyurethane's of the cross-linked type contains a combination of ionic and nonionic internal emulsifiers. When compared to films made from the acetone process, the cured polyurethane films from this process exhibit improved solvent resistance when cross-linked with polyfunctional amines. Although this type of process, and variations thereof, is an improved system the films produced upon curing are almost always inferior to the two-component solvent based aliphatic fully crosslinked air-dry polyurethane's. It is believed this is due to the fact that the aqueous based chain extension is performed in a heterogenous phase and therefore does not proceed as smoothly or as quantitatively as occurs in organic solvent systems, especially the two-component fully crosslinked systems.

Fully crosslinked aliphatic polyurethanes when prepared from solvent-based, two-component systems possess performance properties which are generally far superior to any of the current water based or water borne prepared polyurethane's. These solvent-based two-component fully crosslinked aliphatic polyurethanes provide cured films which resist 30—days submersion in Skydrol (jet aircraft hydraulic fluid) and also resist over 1000 double MEK rubs. Such solvent-based systems contain absolutely no added water and have very low levels of moisture content.

Much has been done toward improving the solvent and chemical acid resistance of water borne polyurethane's. For example, the post treatment of the dispersions with polyaziradines by the user, the use of blocked NCO additions to the dispersion and the use of bake curing with further cross-linking due to the temperature increase have all resulted in improved cured films from water dispersions. Another approach is to replace a portion of the typical polyurethane with other types of polymers. This usually results in aqueous systems which have acrylated or vinyl monomers grafted in the main chain. However, such grafted polymers are not 100% pure aliphatic polyester polyurethane's and certain areas of performance still do not measure up to the solvent based, two-component polyurethane films.

Representative of the prior art water containing urethane preparations is Schriven, et al., U.S. Pat. No. 4,066,591. Many of the problems encountered with water based polyurethanes are described in that patent. Also, the specification delineates in some detail the various types of isocyanates, polyols, compounds containing active hydrogen atoms, chain extenders and the like which can be used in making polyurethane films and coatings. For that reason, this specification and its definitions are incorporated herein by reference.

A more recent and excellent review of the state of the art in water-borne polyurethanes is found in *Rosthauser et al.*, "Waterborne Polyurethanes", *J. Coated Fabrics*; Vol. 16, July 1986, pp. 39-79.

An aqueous polyurethane dispersion, prepared by heating a polyester-polyol and an isocyanate, is shown by Hills et al., U.S. Pat. No. 4,945,128. In the process disclosed, an aqueous dispersion is preferably prepared using a water miscible organic solvent, such as acetone or methyl ethyl ketone (MEK), which boils below 100° C. to dissolve or disperse the polyester-polyol and isocyanate. Heating the dispersion causes the polyols and NCO groups to react forming a urethane. The solvent is distilled off at a lower temperature before the heating process or during the heating of the components. In any event, the product produced is a cross-linked microparticle dispersion allegedly suitable for coating of various substrates.

It would be beneficial to have a water based system which requires the use of no volatile organic compounds (VOCs) at all, which can be prepared at room temperature, which yields polyurethane-polyureas that are fully chain extended and crosslinked and which, when cured, possess film properties as good as or superior to conventional solvent based polyurethane or polyurethane-polyurea films.

OBJECTS AND BRIEF SUMMARY OF THE INVENTION

It is an object of the present invention to provide water based, solvent free, two component polyurethane-polyurea dispersions which are fully chain extended in water and which are free of volatile organic compounds or solvents.

It is also an object of the present invention to provide a method of preparing water based, solvent free, two component polyurethane-polyurea dispersions which are fully chain extended in water and are stable over an extended period of time for purposes of application to a substrate.

Another object of this invention is to provide aqueous dispersions of chain extended polyurethane-polyurea polymers which contain a high solids content but possess low viscosity properties without the use of organic solvents.

An additional object of this invention is to provide water based, solvent free, two component polyurethane-polyurea dispersions which, when applied to a substrate, cure to a film having properties of wear and chemical and abrasion resistance which are equal or superior to films obtained from conventional solvent based polyurethanes.

Yet an addition object of this invention is to provide a polyester-polyol blend which can be utilized in aqueous phases to prepare a variety of water borne or based polyurethane coatings which polyester-polyol blend possesses properties which mimic or impersonate organic solvent phases such that isocyanate precursors react with the polyols of the blend in the aqueous phase as if the reaction was proceeding in a hydrophobic or non-aqueous environment.

A still further object of this invention is to provide an amine blend of chain extenders which are balanced to provide optimal aqueous phase cross-linking with NCO groups in water borne systems for forming polyurethane-polyurea dispersions.

These and other objects may be obtained by means of a two component solvent free system. The first component is formed by admixing two blends in an aqeuous phase. The first blend is a polyester-polyol phase and the second blend is an aqueous amine phase. The polyester-polyol blend is prepared by combination of appropriate modified polyester-polyols, low viscosity polyether or polyester-polyols, chain extending low molecular weight polyols, neutralizing amine components and a detergent to provide a polyester-polyol blend having essentially 100% (i.e. 90-100%) solids as more fully described below. This polyester-polyol blend is totally hydroxyl functional with a carboxylic acid number of between about 10 and 50, an hydroxyl number of between about 180 and 300, an equivalent weight range of between about 165 and 365 and a viscosity of between about 600–1500 cps at 25° C.

The second blend is an aqueous combination of various neutralizing and chain extending amines, as fully explained in the detailed description, wherein the ratios of various amines are preformulated to provide a balanced chain extending, cross-linking reaction in aqueous phase with —NCO or similar reactive groups when combined in an aqeuous phase reaction. The aqueous amine blend will have an equivalent weight of between about 40 to 50 and a solids content of between about 40–60%.

The polyester-polyol phase and aqueous amine phases are combined, with additional water, ammonia, ( if desired), and defoaming agents, at room temperature to form a polyester-polyol/amine aqueous component having a solids content of between about 33 to 48% wherein the equivalent ratio between polyester-polyol phase and aqueous amine phase is between about 1.75:1 to 2.25:2 with the ratio of about 2:1 being optimal.

The second component is a 100% solids aliphatic isocyanate having a viscosity of between 1000–3500 cps at 25° C. The amount of isocyanate used is sufficient to provide an over indexing of —NCO groups to functional groups in the polyester-polyol/amine component of between about 1:1.3 to 1:1.7. This provides sufficient —NCO groups to form hydrogen bonding and maximize crosslinking within the polyurethane-polyurea structure.

The first and second components are combined in aqueous phase to provide a polyurethane-polyurea dispersion having up to 65% solids, and which, following complete cross-linking has a pot life of several hours. The polyester-polyol and amine phase blends are formulated to mimic or impersonate organic solvent phases such that isocyanate precursors react with polyols and amines in the aqueous phase as if the reaction was proceeding in a hydrophobic or non-aqueous environment. Moreover, the amines are selected to react in a balanced sequence or manner to provide optimal and selective reaction with the —NCO groups in the water phase and also to form hydrogen bonding within the polymer network and between polymer molecules. In other words, the aqueous environment is masked to appear to the isocyanate as if it was in an organic solution or solvent. Upon admixing the two components there is an induction period while the mixture is being catalyzed. The resulting aqueous dispersion will have a pH in the range of about 8 to 10 and will have a pot life of up to several, e.g. three to five, hours. This process, having no organic solvents contents, results in a polyurethane-polyurea product which, when cured in air at ambient temperatures, produces a crosslinked film having properties which equal or exceed the solvent-based two component polyurethanes. When applied to a substrate the water is quite rapidly removed by evaporation causing the pH to lower to between about 4.0 and 4.5. The acid pH causes further reaction between —NCO and —$NH_2$ groups resulting in a coating having even greater substrate adhesion and improved resistance to water and solvents.

These water based, solvent free, two component aliphatic polyurethane-polyurea films dry to a coating which resists 30 day Skydrol immersion, survives over 1500 double MEK rubs and has better adhesion due to the bonding structure than their solvent based counterparts. Moreover, this aqueous system, including the presence of the isocyanate, can be made up having a solids content of up to about 65% by weight without presenting problems associated with increased viscosity. A typical dispersion according to the present invention will have a solids content between about 35 and 65% and a viscosity of between about 200 to 300 centipoises at 25° C. using a No. 7 spindle. The solids content can be lowered by dilution with ordinary tap water (or deionized water if desired) to as low as about 35% and still be functional.

Because of the lack of volatile organic components (VOCs), there is no environmental pollution which, coupled with the performance properties, makes this a truly superior product.

DETAILED DESCRIPTION OF THE PREFERRED EMBODIMENTS

There follows a description of the best mode presently known in practicing the invention. However, it will be evident from a reading of this disclosure that other equivalent steps, or measures may be taken to arrive at the two component, solvent free invention.

While not fully understood in scientific terms, the process of the present invention is based on the feasibility of simply making the isocyanate (—NCO) groups see the water as a organic non-reactive medium. The ensuing reactions with polyols and amines resulting in both linear and cross-linking polymerization, will then proceed in a homogenous flow and not be hindered. Two distinct advantages of this process are that (1) there is no need to first formulate a prepolymer by reacting the isocyanate with a polyol and (2) the use of any volatile organic compounds (solvents) is completely avoided.

The system consists essentially of mixing together a two-component mixture consisting of first component comprising an aqueous blend of polyester-polyols and amines with a second component consisting of an aliphatic polyisocyanate.

Polyester-Polyol and Amine Component

This component is an aqueous blend of two phases, which, while particular to the present invention, are also capable of functioning in other solvent based or water dispersible polymeric coating compositions. Each phase, i.e. a polyester-polyol phase and an aqueous amine phase will be described separately. In order to quantitate the amounts of the ingredients or components utilized in relation to each other the term "equivalents" will be used. In general the equivalent ratio between the polyester-polyol phase and aqueous amine phase will vary between about 1.75:1 to 2.25:1 with equivalent ratios of about 2:1 being considered optimal.

Polyester-Polyol Phase

This phase comprises, at a minimum, a mixture of three polyol blends, two amines and a surfactant.

Polyol A

This phase has, as a basic or fundamental component, a polyester-polyol which has been reacted with minor amounts of at least two additional polyfunctional polyols one of which contains a carboxylic acid grouping. Suitable polyester-polyols are staple compositions well known for use in polyurethane chemistry. These are reaction products of polyhydric polyols with polycarboxyic acids or polycarboxylic anhydrides and, in addition to being defined below, are also suitably identified on col. 7, lines 16–46 of U.S. Pat. No. 4,495,128.

As mentioned therein, polyols suitable for the preparation of polyester-polyols are ethylene glycol, 1,2-propanediol, 1,3-propanediol, 1,3-butanediol, 1,4-butanediol, the isomeric pentanediols, hexanediols or octanediols, such as 2-ethyl-1,3-hexanediol, trimethylolpropane, glycerol, bishydroxymethylcyclohexane, erythritol, mesoerythritol, arabitol, adonitol, xylitol, mannitol, sorbitol, dulcitol, hexanetriol, (poly)-pentaerythritol and the like.

Suitable polycarboxylic acids are low molecular weight polycarboxylic acids or anhydrides having between about 2 and 18 carbon atoms, e.g., oxalic acid, succinic acid, fumaric acid, phthalic acid, isophthalic acid, terphthalic acid, tetrahydrophthalic acid, hexahydrophthalic acid, adipic acid, azelaic acid, sebacic acid, maleic acid, glutaric acid, hexachloroheptanedicarboxylic acid, tetrchlorophthalic acid and trimellitic acid and their anhydrides as they exist.

An hexaneadipate diol saturated polyester polyol having a molecular weight of between about 1000 to 2000 is preferred and a polyester-polyol of the 1,4-hexaneadipate diol type is particularly preferred.

The polyester-polyol, preferably of the 1,4-hexaneadipate diol type, is then further reacted with about 1–2% by weight of a trihydric polyol to increase resistance of the ester groupings of the polyester polyols to hydrolysis and with about 10–15% by weight of a polyfunctional diol containing a carboxylic acid group.

The trihydric alcohol, having three terminal hydroxy (—OH) groups, is preferably an α,α,α-trimethylol alkane having a compact neopentyl structure providing high hydroxyl content possessing the formula:

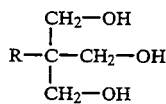

wherein R is an alkyl group of 1 to 8 carbon atoms. Typical of such α,α,α-trimethylol alkanes are trimethylolethane (TME), trimethylolpropane (TMP), trimethylolbutane (TMB) and the like. Particularly preferred is trimethylolethane (TME), i.e. where R is —CH$_3$. The hindrance provided by the branched carbon chain increases resistance of the ester groupings of the polyester polyols to hydrolysis. Ester hydrolysis is a factor in both corrosion resistance and stability. TME, for example, provides a neopentyl carbon structure with three primary hydroxyl groups which are highly reactive plus a central carbon atom, which is in the beta ($\beta$) position relative to all three hydroxyl groups and possesses no hydrogen atoms. This absence of $\beta$-hydrogens helps in blocking elimination processes, which is a common mode of thermal decomposition of polyols. The alpha ($\alpha$) hydrogens are positioned adjacent to both the hydroxyl groups and to the highly branched central carbon atom. Because of this the α-hydrogens are highly hindered resulting in significantly less free-radical attack. From the above structure it will also be noted that TME has no secondary hydroxyl groups and no tertiary hydrogen atoms. Secondary hydroxyl groups are slow to react. A secondary hydroxyl group requires the presence of a tertiary hydrogen atom and tertiary hydrogen atoms are very susceptible to free radical attack, particularly when attached to the same carbon atom as an oxygen and even more so in the presence of water.

The carboxylic group-containing diols are preferably the α,α-dimethylol alkanoic acids of the formula:

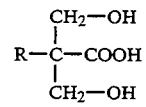

wherein R is an alkyl group of 1 to 8 carbon atoms. Typical of such α,α-dimethylol alkanoic acids are 2,2-dimethylol propionic acid, 2,2,-dimethylol butyric acid, 2,2-dimethylol pentanoic acid and the like. These α,α-dimethylol alkanoic acids are prepared by the oxidation of the corresponding α, α, α-trimethylolalkanes described above.

Particularly preferred is 2,2-dimethylol propionic acid (DMPA) where R is —CH$_3$. DMPA is a trifunctional compound incorporating a hindered tertiary carboxylic acid group and two reactive primary hydroxyl groups. The hindered carboxyl moiety is less reactive than most acid groups. Therefore, DMPA, in this system reacts as a diol. A major advantage of reacting DMPA with the initial polyester-polyol is due to the fact that the hindered carboxyl moiety of DMPA is not reactive to isocyanates below a temperature of about 80° C. which renders it a suitable component for curing systems which can be air dried at ambient temperatures. While the carboxyl moiety is not isocyanate reactive at temperatures below about 80° C., the hydroxyl groups of DMPA are reactive to isocyanates at these temperatures. In the cross-linking phase, the DMPA forms amides from resulting carboxylic acids. Also, upon crosslinking allophanates (N-carbalkoxyureas) form from the urethane and, also, biurets form from urea. All three i.e., amides, allophanates and biurets, contribute significantly to higher molecular weight build up and higher percent cross-linking all of which occur totally in a water solution without the necessity of adding any organic solvent. The crosslinking occurs primarily when the product is applied to a substrate and the water evaporates. There is a lowering of the pH (e.g. from about 9.2 to 4.5) which functions as a catalyst causing the crosslinking of —NCO and —NH$_2$ groups.

The polyester-polyol described above will have an equivalent weight of between about 750 to 850 and OH number of from 55 to 100. A particularly preferred polyester-polyol of this type has a color of 1+ Gardner, an Acid Number of about 47–51, an hydroxyl number in the 60–80 range, a moisture content of <0.10 and a viscosity at 60° of about 2000 to 3000 centiposes. It has a molecular weight of about 2000 and an equivalent weight of about 798.

This type of polyol, due to its stearic configuration, is critical to the functioning of the invention in masking the aqueous polyol dispersion and making it appear as a solvent based system to the isocyanate.

Polyol A will generally be present in amounts ranging between about 0.33 to 0.67 equivalents with ranges between about 0.4 to 0.55 being preferred.

Polyol B

This polyol is a member selected from the group consisting of aliphatic polyether-polyols, polyester-polyols and trihydric modified polyester polyols having an equivalent weight of between about 150 and 200 and an hydroxyl number between about 300 and 400.

Suitable are aliphatic polyether-polyols having the formula:

$$HO-R'-[OR'']_nOH]_m$$

wherein R' is an alkylene radical containing from 2 to 10 carbon atoms, R" is an alkylene radical of 2 to 4, preferably 3 to 4, carbon atoms, n is an integer of 3 to 50 and m is an integer of 1 or 2. Such aliphatic polyols will generally have an average molecular weight of between about 400 and 5000.

Another and preferred class of polyols are the polyester-polyols referenced under Polyol A above, i.e. the reaction products of polyhydric polyols with polycarboxyic acids or polycarboxylic anhydrides having a molecular weight of between about 1000 and 2000. Depending upon the final use desired, this polyester-polyol may also be modified to have incorporated in its structure between about 2 and 10% of a trihydric polyol or trimethylolalkane, i.e. TME or TMP, referenced above under Polyol A. The higher contents of trimethylolalkane provide polymer backbones which are more flexible for applications on leather or similar substrates but are somewhat less acid resistant than those of lower trimethylolalkane content.

The selection of this polyol may be empirical and offers considerable variability in providing polyurethane-polyurea coatings designed for a particular use. The polyester-polyols and trihydric modified polyester-polyols are particularly preferred as they contribute to and enhance the polyester backbone of the polyurethane-polyurea coating.

Polyol B will generally be present in amounts ranging between about 0.45 to 0.75 equivalents with ranges of between about 0.55 and 0.65 being preferred.

Polyol C

This polyol is a polyfunctional diol or triol having an equivalent weight of between about 30 and 60. Suitable polyols include 1,2-propanediol, 1,3-propanediol, 1,3-butanediol, 1,4-butanediol, the isomeric pentanediols and triols, hexanediols and triols or octanediols and triols. These polyfunctional polyols function as chain extenders and do not form part of the polyester-polyol backbone as do Polyols A and C. Preferred are the butanediols with 1,4-butanediol being particularly preferred.

Polyol C normally parallels Polyol A in equivalents and will therefore generally be present in amounts ranging between about 0.33 to 0.67 equivalents with ranges between about 0.4 to 0.55 being preferred.

Blended into the polyol phase and forming part thereof is an amine mixture which serves as a neutralizing agent and functions to provide urea groups to the crosslinked polyurethane-polyurea coating. The ratio of these amines, particularly to Polyol C, is quite critical. Thus, while Polyol C is present in amounts ranging between about 0.33 to 0.67 equivalents, the combined equivalents of Amines 1 and 2 will generally vary within a ratio of between about 0.8:1 to 1.2:1 of the Polyol C equivalents.

Amine 1

This neutralizing amine functionality ("first neutralizing amine") is selected from the group consisting of diethanol amine (DEA) and triethanol amine (TEA) and mixtures thereof. Preferred is a blend comprising about 10-20% by weight of DEA and 80-90% by weight TEA and most particularly a blend of 15% DEA and 85% TEA. Most particularly preferred is a blend of 15% DEA/85% TEA which has been diluted by the addition of 15% water. This amine or amine mixture may be present in amounts varying between about 0.15 to 0.33 equivalents with equivalent ranges of between about 0.20 to 0.25 being preferred.

Amine 2

This neutralizing amine functionality ("second neutralizing amine") is an amino alcohol containing both primary amino (—NH$_2$) and methylol (—CH$_2$OH) groups. Suitable amino alcohols are selected from the group consisting of 2-amino-2-methyl-1-propanol (AMP) and tris(hydroxymethyl)aminomethane. AMP is preferred with AMP-95, which contains 95% AMP and 5% water, being most preferred Amine 2 serves the same purpose as Amine 1 as a neutralizing agent and interacting to form urea groups and may be present in amounts varying between about 0.15 to 0.33 equivalents with equivalent ranges of between about 0.20 to 0.30 being preferred.

Detergent

The final component to the polyester-polyol phase is a detergent which lowers viscosity and provide proper coalescence to the polyester-polyol phase. The detergent is preferably of the nonionic type and does not chemically react or interact with the other ingredients of the polyol phase. A particularly preferred detergent is a 100% active polymeric dispersant with nonionic anchor groups marketed under the name Solesperse 27000 by ICI Specialties of Manchester, England. Other inert detergents may also be utilized such as those marketed under the name Surfynol by Air Products Co. A amount of detergent added to the polyester-polyol phase may vary. Since it is non-reactive it is not determined in terms of equivalency. Generally, to function adequately, it will be present in amounts ranging between about 1–5% by weight of the polyester-polyol composition.

The polyester-polyol ingredients utilized are simply mixed together at a low speed to form the polyester-polyol phase blend in the presence of atmospheric moisture and in a zero VOC system. There is no need for utilizing a closed reactor with added heat and with the ingredients being under a nitrogen blanket, as is required for the manufacturing of the above mentioned prior art aqueous aliphatic polyurethane dispersions. Although the polyols are mixed and blended in the presence of atmospheric moisture, this is not a problem because now the process is advantageously carried out in a zero VOC water-based system. When prepared, polyester-polyol phase blend will be essentially 100% solids (i.e. 90–100% solids with the aqueous content being attributed to minor amounts of water which may be formulated in Amines 1 and 2) and will have an equivalent weight range of between about 165 and 365, an acid number of between about 10 and 50, an hydroxyl number of between about 180 and 300 and a viscosity of from about 600–1500 cps at 25° C. Further, the polyester-polyol will have a polyester backbone. Polyethers and/or polyol backbones are not suitable.

While this polyester-polyol phase blend has been formulated primarily for use in the formation of aqueous polyurethane-polyurea dispersions as disclosed herein, it has been found that this blend is also functional for blending with other ingredients. This blend can be substituted for almost any polyester-polyol phase and utilized in either solvent based or water borne systems along with a variety of prepolymers, chain extenders and the like and reacted with isocyanates or other catalysts used in forming resin coatings.

Amine Phase

This phase is described as a blend because it functions optimally in the presently claimed invention as a balanced group of chain extending and neutralizing amines. In a blended phase it is analogous to the polyester-polyol phase in that it is suitable for use in other systems. For example, it may also be added to a polyester-polyol, polyol, polyether-polyol, etc., blend for the same purpose and therefore its use is not limited to the specific polyurethane-polyurea embodiment disclosed herein.

The terminology used in distinguishing the various amines, i.e. neutralizing and chain-extending, is for purposes of identification and not classification. Some amines can function both as neutralizing agents and chain-extenders and to attempt to categorize each only according to function would not be accurate. However, the combination of amines in their relative equivalent ranges is important to the optimal functioning of the invention.

Amines 1 and 2

These amines are the same as Amines 1 and 2 utilized in the polyester-polyol blend and are present in the amine phase in the same equivalent ranges.

Amine 3

This chain-extending amine functionality is a relatively slow acting chain extender comprising a lower dialkanolamine containing from about 2 to 4 carbon atoms in the chain, i.e. a dialkanolamine selected from the group consisting of diethanolamine, di-n-propanolamine, diisopropanolamine, and the various isomers of dibutanolamine. This amine is present in relatively low amounts ranging in equivalents from between about 0.045 to 0.075 with equivalent ranges of between about 0.05 and 0.07 being preferred.

Amine 4

This amine is a rapid acting chain extender and is selected from the group consisting of diethylenetriamine and triethylenetetraamine. It is used in almost the same equivalent amounts as Amine 3, i.e. in relatively low amounts ranging in equivalents from between about 0.045 to 0.075 with ranges of between about 0.05 and 0.07 being preferred. In certain instances, this amine may be optional provided the equivalent amount of Amine 5 is increased accordingly. For optimal results Amine 4 will be present. However, for completeness, Amine 3 may be an amine selected from the group consisting of diethylenetriamine, triethylenetetraamine and 2-methylpentamethylenediamine.

Amine 5

Amine 5 is 2-methylpentamethylenediamine (MPMD) or 2-methyl-1,5-diaminopentane. MPMD is very important in extending the pot life of the polyurethane-polyurea water dispersion. While not known as a surety, it is believed that MPMD increases hydrogen bonding and provides optimal isocyanate (—NCO) cross-linking. MPMD is present in the amine blend in amounts ranging from between about 0.15 to 0.25 equivalents with ranges of between about 0.18 and 0.22 being preferred. MPMD lowers viscosity enabling a higher solids content of formulations it is used in. Although it contains no secondary amine group, as does Amine 4, MPMD behaves similarly in some instances and, in such cases, may be used as a substitute for Amine 4.

Amine 6

Amine 6 is 1,3-diaminopentane (DAMP) and may be present in amounts of between about 0.15 to 0.3 equivalents. DAMP reacts much more quickly than the other amines in functionality and is a key in facilitating the cross-linking reaction of NCO with amines rather than to water. Amine 6 actually reacts more rapidly than Amine 4.

When blended together the amine phase will have an equivalent weight of between about 40 and 50. The various amine components are blended together in water (tap water is suitable) to form a blend having a solids content of between about 40–60% by weight.

Formation of Polyester-Polyol/Amine Component

The polyester-polyol phase and amine phase may be directly blended together at room temperature in an open vessel because there are no solvents to be concerned about.

There are three fundamental rules which have been found applicable to the optimal functionality of the polyester-polyol/amine component. First, the total number of equivalents between the polyester-polyol blend and the amine phase should be between about 1.75:1 and 2.25:1 with ratios of between about 1.9:1 and 2.1:1 being preferred and rations of 2:1 being considered most preferred. Secondly, taking into consideration the equivalents of amines in both the polyester-polyol phase and the amine phase, the equivalent ratio between amines and polyester-polyols will be between about 0.8:1 and 1.2:1 with a 1:1 ratio being considered about optimal. Thirdly, the number of neutralizing amines (Amine 1 and 2) equivalents to cross-linking amine (Amines 3–6) equivalents will range between a ratio of about 1.4: to 1.6:1 with 1.5:1 being preferred.

There are various means or ways of formulating the polyester-polyol/amine component. Preferably the polyester-polyol phase is blended in a mixing tank with water containing any desired additives such as defoaming agents, surface tension reducing agents, agents to regulate pH (such as ammonia), etc. Any suitable defoaming agent or combination of agents, e.g. silicone or non-ionic acetylenic diols may be utilized and is not critical provided it is functional. This aqueous bland is formulated at room temperature. To this is blended the amine phase resulting in an overall polyester-polyol/amine component having a solids content of between about 33 to 48% by weight. If desired, the amine components of the amine phase can be added sequentially. One particular advantage of the polyester-polyol/amine component is that the polyester-polyol blend and the amine blend can be formulated and shipped separately. These phases can then be blended with water at a suitable mixing site without the need of shipping water which comprises over 50% of the final blend. However, the final blend will have a balance of the polyester-polyols and amines within the equivalent ratios as outlined herein.

Aliphatic Polyisocyanate Component

The second component is a solvent-free, i.e., 100% solids, aliphatic polyisocyanate having a viscosity of between 1000–3500 cps at 25° C. The preferred polyisocyanate is a diisocyanate. Typical diisocyanates are straight chain aliphatic diisocyanates such as 1,4-tetramethylene diisocyanate and 1,6-hexamethylene diisocyanate. However, cycloaliphatic diisocyanates may also be utilized as may the corresponding thioisocyanate derivatives. Particularly preferred is a hexamethylene diisocyanate (HDI) either manufactured by Miles Laboratories under the tradename Desmodur N-3200 or by Rhone-Poulenc under the tradename Tolonate HDT-LV.

This two-component system is completed by blending between about 1.3 to 1.7 equivalents of the isocyanate component with each equivalent of the polyester-polyol/amine component. This amount of isocyanate used is sufficient to provide an over indexing of —NCO groups to functional groups in the polyester-polyol/amine component of between about 1:1.3 to 1:1.7. This provides sufficient —NCO groups to form hydrogen bonding and maximize crosslinking within the polyurethane-polyurea structure.

This blend results in an aqueous, organic solvent free polyurethane dispersion having a solids content of between about 55 to 65%. This provide an excellent zero VOC protective coating blend for application to almost any substrate such as concrete, wood and metal. It is particularly suitable for application to substrates that are subject to spillage of corrosive chemicals, or to heavy traffic where abrasion resistance is required. It is also designed for use where a highly esthetics, extremely durable protective coating is required. It is an excellent coating for severe coastal, offshore or chemical environments where both corrosion protection and resistance to fading, peeling or chalking from exposure to sunlight are desired. Further, it is an outstanding anti-graffiti coating. It may be applied to clean and dry substrates at temperatures above about 50° F. and cleans up completely and easily with soap and water.

This two-component system cures through chemical reaction and is therefore not dependant on atmospheric conditions. It is also not sensitive to moisture introduced into the container from exposure to the air or while mixing in additives such as colorants. After using the amount desired, the container may be reclosed without impairment of the remaining contents. Additionally, the blend is water reducible. When being thinned or reduced, ordinary tap water may be used. There is no limit to the amount of thinning or reducing which may take place. However, for best results the solids content of the reduced blend should not be less than about 35%.

As noted above, the dispersion can have blended in coloring agents such as pigments, dyes, stains, etc. Additionally, other water-based additives may be blended in as leveling aids, thixotrops, anti-mar or anti-skid agents or any other agents which do not adversely affect the aqueous dispersion and its ability to coat and cure a substrate.

EXAMPLES

A zero VOC, two component linear polyurethane-polyurea is made according to the above described procedures. These examples demonstrate the best mode currently known for practicing the invention. However variables such as amounts of agents used, their ratio to each other, etc., are certainly subject to change and fine tuning as additional experience is attained and further research and development is conducted. Therefore, the invention is not limited in scope to the specific embodiments disclosed. Rather, the examples are to be considered as representative of various embodiments which one skilled in the art can readily determine in accordance with the description contained herein.

EXAMPLE 1

Polyester-polyol/amine Phase Preparation

First a base polyol blend was constructed by blending together, in an open container, a mixture of Polyols A, B and C, Amines 1 and 2 and a surfactant all of which are more specifically described as follows:

The Polyol A component consisted of 0.46 equivalents or 375 parts by weight of an 1,4-hexaneadipate diol saturated polyester polyol reacted with about 2% by weight to TME and 12% by weight of DMPA. The resulting polyester-polyol had a molecular weight of about 1800, an equivalent weight of about 810 and OH number of about 70 and an acid number of about 48. It had a color of 1+ Gardner, a moisture content of <0.12 and a viscosity at 60° C. of about 2600 cps.

The Polyol B component used consists of 0.63 equivalents or 120 parts by weight (100% solids) of a low viscosity diol type polyester polyol having an equivalent weight about 146, an hydroxyl number of about 380, and an acid number of about 0.1.

Polyol C is 1,4-butane diol and 0.46 equivalents or 21 parts by weight was utilized. Polyol C has an equivalent weight of 45 and an hydroxyl number of 1245.

To this base polyol blend was added 0.22 equivalents, or 11 parts by weight, of Amine 1 comprising 85% triethanol amine (TEA) and 15% diethanol amine and 0.23 equivalents, or 10.5 parts by weight, of Amine 2 (AMP-95) or 95% 2-amino-2-methyl-1-propanol.

The polyester-polyol phase was completed by blending in 16 parts by weight of a 100% active polymeric dispersant containing non-ionic anchor groups.

The resulting polyester-polyol blend of 1.55 equivalents polyester-polyol (Polyol A+B+C), 0.45 equivalents of amine (Amine 1+2) and dispersant consisted of a 553.5 parts by weight mixture containing 2 equivalents of polyol/amine having an average equivalent weight of 262.5, an acid number of about 30, an hydroxyl number of about 225 and a viscosity at 25° C. of about 800 cps.

EXAMPLE 2

Neutralizing/Chain Extending Amine Phase Preparation

A neutralizing/chain extending amine blend was prepared by mixing together 0.20 equivalents, or 10 parts by weight, of Amine 1 comprising 85% triethanol amine (TEA) and 15% diethanol amine; 0.22 equivalents, or 10 parts by weight, of Amine 2 (AMP-95) or 95% 2-amino-2-methyl-1-propanol; 0.06 equivalents, or 2 parts by weight of Amine 3 which was diethanolamine; 0.07 equivalents, or 2 parts by weight of Amine 4 which was diethylenetriamine; 0.23 equivalents, or 13.5 parts by weight, of Amine 5 which was 2-methylpentamethylenediamine (MPMD); and 0.22 equivalents, or 5.5 parts by weight of Amine 6 which was 1,3-diaminopentane (DAMP). These amines were blended or stirred together in sufficient water to provide an amine solution having a solids content of about 50%.

The resulting amine blend consisting of a total of 1 equivalent of combined amines (Amine 1+2+3+4+5+6) consisted of 43 parts by weight (which was also the average equivalent weight) of amine in 43 parts by weight of water.

EXAMPLE 3

Polyester-polyol/Amine Component Preparation

The polyester-polyol/amine blend from Example 1 was added to a vat containing an aqueous solution consisting of about 790 parts by weight water, 25 parts by weight of a 2-butoxy ethanol/ammonium perfluoroalkyl sulfonate surfactant (Flurad FC120) to change surface tension and 10 parts by weight of a silicone based defoamer (Surfynol DF-80).

To the aqueous polyester-polyol/amine solution was then added the amine phase mixture from Example 2, 86 parts by weight, and the entire solution was mixed by stirring until a homogeneous solution was attained at room temperature. Sufficient ammonium hydroxide (NH4OH) was added to provide a final pH of about 9.2. This completed the formulation of the polyester-polyol/amine component. The use of ammonia is not considered necessary but it believed to improve the shelf life of this component. It is suggested that a small amount, i.e., about 0.25 parts, of a cure accelerator such as dibutyltindilaurate catalyst containing 12% tin could be added to the above component.

This aqueous mixture of polyester-polyols and amines contained approximately 1485 parts by weight of which 569 or 38% was solids. The mixture has an equivalent weight of about 186, an hydroxyl number of about 302 and a viscosity at 25° C. of about 100 cps. e.g.

Example 4

Polyurethane/Polyurea Dispersion Preparation

To the polyester-polyol/amine component was mixed 4.5 equivalents, or about 815 parts by weight, of an aliphatic polyisocyanate resin based on hexamethylene diisocyanate having an equivalent weight of 181, a viscosity at 25° C. of about 1200±300 cps and an —NCO content of 23.0±1% (Tolonate HDT-LV) at ambient temperature. This provided an overindexing of —NCO equivalents to component one equivalents of about 1.5:1.

The resulting aliphatic polyurethane-polyurea dispersion was completely free of volatile organic components (VOC) and has a solids content of about 60% and weighs about 9.0 pounds per gallon. This blend is sufficient to cover between about 300 to 500 square feet per gallon, has a pot life of between about 3 to 5 hours, depending upon ambient temperature, and has an air dry cure and or recoat time of between about 2 to 4 hours, also depending upon temperature.

If desired, this blend can be mixed or reduced at a 1:1 ratio with tap or deionized water.

The physical properties of a cured film of this blend are as follows:

| Test: | ASTM Number | Results |
|---|---|---|
| Hardness | ASTM D-2240 Shore D | 4H |
| Elongation | ASTM D-412 | 100% |
| Tensile Strength | ASTM D-412 | 6,000 lbs/inch |
| Adhesive Strength | ASTM D-902 (peel on unprimed concrete) | 175 pli |
| Water Absorption | ASTM D-471 | 0.05 by weight |
| Tear Resistance | ASTM D-1004 | 150 pli |
| Abrasion Resistance | ASTM D-412 800 mg. Taber abraser | <35 mg. |
| Weatherability | ASTM D-822 Weatherometer | Excellent |
| Temperature Range Service | ASTM Fed. Std. Method 6223 | −65° to 200 F. |
| MEK Double Rub Resistance | | 3000+ |

Chemical Resistance:

There was no adverse effect on a film coated aluminum substrate when immersed for 14 days at 25° C. in the following solutions:salt water, distilled water, 50% detergent solution, chlorinated pool water, anti-freeze, motor oil, hydraulic brake fluid, jet aircraft hydraulic fluid and gasoline.

Other examples within the above stated parameters can be formulated with similar results. For example, the polyester-polyol blend can be formulated and utilized as a separate component for use in various systems. The amine blend can be formulated together and utilized as a separate component in other systems also. In the alternative, the various amines can be added to an aqueous polyester-polyol system individually rather than as a package. Because the system is completely free of organic solvents, the means of mixing or bringing the ingredients together is not critical which is a distinct advantage over prior art systems most of which require at least some solvent even though the system is considered to be an water borne urethane.

While the above shows a complete and preferred embodiment of the invention, it will be evident to those skilled in the art that certain modifications and/or substitutions may be made without departing from the scope of the invention which is limited only by the appended claims and functional equivalents thereof.

I claim:

1. A water based, solvent free, two component polyurethane-polyurea dispersion having a solids content of up to 65% by weight comprising the reaction product of an organic solvent free polyester-polyol blend/amine blend aqueous phase component and a 100 percent solids aliphatic polyisocyanate component comprising:
  a) a polyester-polyol blend/amine blend aqueous phase component having a solids content of between about 33 and 48%, a viscosity of between about 100 and 250 cps at 25° C. and a polyester-polyol blend to amine blend equivalent ratio of between about 1.75:1 to 2.25:1 comprising an aqueous dispersion of:
    1) a polyester-polyol blend containing (a) from 0.33 to 0.67 equivalents of a modified polyester-polyol comprising the reaction product of polyhydric polyols with a member selected from the group consisting of polycarboxyic acids and poycarboxylic anhydrides containing from 1 to 2% by weight of a trihydric polyol and from about 10–15% by weight of a polyfunctional diol containing a carboxylic acid group, said modified polyester-polyol having a molecular weight of between about 1000 to 2000, an equivalent weight of between about 750 to 850 and a hydroxyl number of between about 55 to 100; (b) 0.45 to 0.75 equivalents of a low viscosity polyol comprising a member selected from the group consisting of aliphatic polyether-polyols and polyester-polyols and trihydric polyol modified polyester-polyols having an equivalent weight of between about 150 and 200 and an hydroxyl number of between about 300 and 350; (c) 0.33 to 0.67 equivalents of a low molecular weight chain extending diol or triol having from three to eight carbon atoms and having a equivalent weight of from about 30 to 60; (d) 0.15 to 0.33 equivalents of a first neutralizing amine selected from the group consisting of diethanol amine and triethanol amine and mixtures thereof; (e) 0.15 to 0.33 equivalents of a second neutralizing amine selected from the group consisting of 2-amino-2-methyl-1-propanol and tris(hydroxymethyl-)aminomethane; and (f) 1–5% by weight of a non-reactive non-ionic detergent; said polyester-polyol blend having a solids content of between 90 and 100%, an equivalent weight of between about 165 to 365; an hydroxyl number of between about 180 to 300, an acid number of between about 10 and 50 and a viscosity of between about 600 to 1500 cps at 25° C. and, 2) an aqueous amine blend containing (g) 0.15 to 0.33 equivalents of a first neutralizing amine selected from the group consisting of diethanol amine and triethanol amine and mixtures thereof; (h) 0.15 to 0.33 equivalents of a second neutralizing amine selected from the group consisting of 2-amino-2-methyl-1-propanol and tris (hydroxymethyl) aminomethane; (i) 0.045 to 0.075 equivalents of a first chain extending amine consisting of a lower dialkanolamine containing from about 2 to 4 carbon atoms; (j) 0.045 to 0.075 equivalents of a second chain extending amine comprising a member selected from the group consisting of diethylenetriamine and triethylenetetraamine; (k) 0.15 to 0.25 equivalents of a third chain extending amine consisting of 2-methylpentamethylenediamine; and (l) 0.15 to 0.3 equivalents of a fourth chain extending amine consisting of 1,3-diaminopentane; said amine blend having an equivalent weight of between about 40 and 50 and containing a solids content of between about 40 and 60% by weight, and b) an aliphatic polyisocyanate having a viscosity of between 1000–3500 cps at 25° C.;

wherein the ratio between isocyanate component equivalents and polyester-polyol/amine component equivalents is between about 1.3:1 to 1.7:1.

2. A water based, solvent free, two component polyurethane-polyurea dispersion according to claim 1 wherein said modified polyester-polyol is a modified hexaneadipate diol saturated polyester polyol, said trihydric alcohol is an α,α,α-trimethylol alkane having the formula:

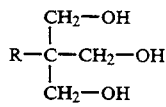

wherein R is an alkyl group of 1 to 8 carbon atoms and said polyfunctional diol containing a carboxylic acid group is a α,α-dimethylol alkanoic acid of the formula:

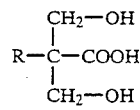

wherein R is an alkyl group of 1 to 8 carbon atoms.

3. A water based, solvent free, two component polyurethane-polyurea dispersion according to claim 2 wherein said hexaneadipate diol is a 1,4-hexaneadipate diol, said α,α,α-trimethylol alkane is a member selected from the group consisting of trimethylolethane, trimethylolpropane and trimethylolbutane and said α,α-dimethylol alkanoic acid is a member selected from the group consisting of 2,2-dimethylol propionic acid, 2,2,-dimethylol butyric acid, 2,2-dimethylol pentanoic acid.

4. A water based, solvent free, two component polyurethane-polyurea dispersion according to claim 3 wherein said low viscosity polyol is a member selected from the group consisting of polyester-polyols and trihydric polyol modified polyester-polyols having incorporated therein between about 2 and 10% of α,α,α-trimethylolalkane selected from the group consisting of trimethylolethane, trimethylolpropane and trimethylolbutane.

5. A water based, solvent free, two component polyurethane-polyurea dispersion according to claim 4 wherein said α,α,α-trimethylol alkane is trimethylolethane and said α,α-dimethylol alkanoic acid is 2,2-dimethylol propionic acid.

6. A water based, solvent free, two component polyurethane-polyurea dispersion according to claim 5 wherein said low molecular weight chain extending diol or triol is 1,4-butanediol.

7. A water based, solvent free, two component polyurethane-polyurea dispersion according to claim 6 wherein said first neutralizing amine is a mixture comprising a major amount of triethanol amine and a minor amount of diethanol amine.

8. A water based, solvent free, two component polyurethane-polyurea dispersion according to claim 7 wherein said second neutralizing amine is 2-amino-2-methyl-1-propanol.

9. A water based, solvent free, two component polyurethane-polyurea dispersion according to claim 8 wherein said first neutralizing amine is a mixture comprising about 85% of triethanol amine and 15% of diethanol amine.

10. A water based, solvent free, two component polyurethane-polyurea dispersion according to claim 9 wherein said non-ionic detergent is a 100% active polymeric dispersant with nonionic anchor groups.

11. A water based, solvent free, two component polyurethane-polyurea dispersion according to claim 9 wherein said first chain extending amine is diethanol amine.

12. A water based, solvent free, two component polyurethane-polyurea dispersion according to claim 11 wherein said second chain extending amine is diethylenetriamine.

13. A substrate having coated on at least one surface thereof a cured and crosslinked polyurethane-polyurea coating obtained by applying to said substrate a thin layer of a water based, solvent free, two component polyurethane-polyurea dispersion having a solids content of up to 65% by weight comprising the reaction product of an organic solvent free polyester-polyol blend/amine blend aqueous phase component and a 100 percent solids aliphatic polyisocyanate component comprising:

a) a polyester-polyol blend/amine blend aqueous phase component having a solids content of between about 33 and 48%, a viscosity of between about 100 and 250 cps at 25° C. and a polyester-polyol blend to amine blend equivalent ratio of between about 1.75:1 to 2.25:1 comprising an aqueous dispersion of:

1) a polyester-polyol blend containing (a) from 0.33 to 0.67 equivalents of a modified polyester-polyol comprising the reaction product of polyhydric polyols with a member selected from the group consisting of polycarboxyic acids and polycarboxylic anhydrides containing from 1 to 2% by weight of a trihydric polyol and from about 10–15% by weight of a polyfunctional diol containing a carboxylic acid group, said modified polyester-polyol having a molecular weight of between about 1000 to 2000, an equivalent weight of between about 750 to 850 and a hydroxyl number of between about 55 to 100; (b) 0.45 to 0.75 equivalents of a low viscosity polyol comprising a member selected from the group consisting of aliphatic polyether-polyols and polyester-polyols and trihydric polyol modified polyester-polyols having an equivalent weight of between about 150 and 200 and an hydroxyl number of between about 300 and 350; (c) 0.33 to 0.67 equivalents of a low molecular weight chain extending diol or triol having from three to eight carbon atoms and having a equivalent weight of from about 30 to 60; (d) 0.15 to 0.33 equivalents of a first neutralizing amine selected from the group consisting of diethanol amine and triethanol amine and mixtures thereof; (e) 0.15 to 0.33 equivalents of a second neutralizing amine selected from the group consisting of 2-amino-2-methyl-1-propanol and tris(hydroxymethyl)aminomethane; and (f) 1–5% by weight of a non-reactive non-ionic detergent; said polyester-polyol blend having a solids content of between 90 and 100%, an equivalent weight of between about 165 to 365; an hydroxyl number of between about 180 to 300, an acid number of between about 10 and 50 and a viscosity of between about 600 to 1500 cps at 25° C. and, 2) an aqueous amine blend containing (g) 0.15 to 0.33 equivalents of a first neutralizing amine selected from the group consisting of diethanol amine and triethanol amine and mixtures thereof; (h) 0.15 to 0.33 equivalents of a second neutralizing amine selected from the group consisting of 2-amino-2-methyl-1-propanol and tris (hydroxymethyl) aminomethane; (i) 0.045 to 0.075 equivalents of a first chain extending amine consisting of a lower dialkanolamine containing from about 2 to 4 carbon atoms; (j) 0.045 to 0.075 equivalents of a second chain extending amine comprising a member selected from the group consisting of diethylenetriamine and triethylenetetraamine; (k) 0.15 to 0.25 equivalents of a third chain extending amine consisting of 2-methylpentamethylenediamine; and (l) 0.15 to 0.3 equivalents of a fourth chain extending amine consisting of 1,3-diaminopentane; said amine blend having an equivalent weight of between about 40 and 50 and containing a solids content of between about 40 and 60% by weight, and b) an aliphatic polyisocyanate having a viscosity of between 1000–3500 cps at 25° C.;

wherein the ratio between isocyanate component equivalents and polyester-polyol/amine component equivalents is between about 1.3:1 to 1.7:1.

14. A substrate according to claim 13 wherein, in the water based, solvent free, two component polyurethane-polyurea dispersion applied, said modified polyester-polyol is a modified hexaneadipate diol saturated polyester polyol, said trihydric alcohol is an α,α,α-trimethylol alkane having the formula:

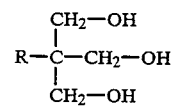

wherein R is an alkyl group of 1 to 8 carbon atoms and said polyfunctional diol containing a carboxylic acid group is a α,α-dimethylol alkanoic acid of the formula:

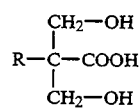

wherein R is an alkyl group of 1 to 8 carbon atoms.

15. A substrate according to claim 14 wherein, in the water based, solvent free, two component polyurethane-polyurea dispersion applied, said hexaneadipate diol is a 1,4-hexaneadipate diol, said α,α,α-trimethylol alkane is a member selected from the group consisting of trimethylolethane, trimethylolpropane and trimethylolbutane and said α,α-dimethylol alkanoic acid is a member selected from the group consisting of 2,2-dimethylol propionic acid, 2,2,-dimethylol butyric acid, 2,2-dimethylol pentanoic acid.

16. A substrate according to claim 15 wherein, in the water based, solvent free, two component polyurethane-polyurea dispersion applied, said low viscosity polyol is a member selected from the group consisting of polyester-polyols and trihydric polyol modified polyester-polyols having incorporated therein between about 2 and 10% of α,α,α-trimethylolalkane selected from the group consisting of trimethylolethane, trimethylolpropane and trimethylolbutane.

17. A substrate according to claim 16 wherein, in the water based, solvent free, two component polyurethane-polyurea dispersion applied, said α,α,α-trimethylol alkane is trimethylolethane and said α,α-dimethylol alkanoic acid is 2,2-dimethylol propionic acid.

18. A substrate according to claim 17 wherein, in the water based, solvent free, two component polyurethane-polyurea dispersion applied, said low molecular weight chain extending diol or triol is 1,4-butanediol.

19. A substrate according to claim 18 wherein, in the water based, solvent free, two component polyurethane-polyurea dispersion applied, said first neutralizing amine is a mixture comprising a major amount of triethanol amine and a minor amount of diethanol amine.

20. A substrate according to claim 19 wherein, in the water based, solvent free, two component polyurethane-polyurea dispersion applied, said second neutralizing amine is 2-amino-2-methyl-1-propanol.

21. A substrate according to claim 20 wherein, in the water based, solvent free, two component polyurethane-polyurea dispersion applied, said first neutralizing amine is a mixture comprising about 85% of triethanol amine and 15% of diethanol amine.

22. A substrate according to claim 21 wherein, in the water based, solvent free, two component polyurethane-polyurea dispersion applied, said non-ionic detergent is a polymeric dispersant with nonionic anchor groups.

23. A substrate according to claim 22 wherein, in the water based, solvent free, two component polyurethane-polyurea dispersion applied, said first chain extending amine is diethanol amine.

24. A substrate according to claim 22 wherein, in the water based, solvent free, two component polyurethane-polyurea dispersion applied, said second chain extending amine is diethylenetriamine.

* * * * *